United States Patent [19]
Nesbit et al.

[11] Patent Number: 5,877,970
[45] Date of Patent: Mar. 2, 1999

[54] ANALYTICAL METHOD AND SYSTEM FOR THE DESIGN OF IRON CLUB HEADS

[75] Inventors: Steven M. Nesbit, Easton, Pa.; Terry A. Hartzell, Madison, Wis.

[73] Assignee: United States Golf Association, East Hanover, N.J.

[21] Appl. No.: 514,147

[22] Filed: Aug. 11, 1995

[51] Int. Cl.$^6$ .................................................. G06F 19/00
[52] U.S. Cl. .............. 364/578; 364/474.01; 364/468.01; 395/120; 395/964
[58] Field of Search .............................. 364/578, 474.01, 364/917, 468.01; 395/120, 964

[56] References Cited

U.S. PATENT DOCUMENTS

| | | | |
|---|---|---|---|
| 5,082,278 | 1/1992 | Hsien | 273/164 |
| 5,251,160 | 10/1993 | Rockwood et al. | 364/578 |
| 5,377,978 | 1/1995 | Lee | 273/77 |
| 5,481,465 | 1/1996 | Itoh et al. | 364/468 |
| 5,488,692 | 1/1996 | Karasick et al. | 395/120 |
| 5,505,453 | 4/1996 | Mack | 273/186.2 |
| 5,505,795 | 4/1996 | Tsai et al. | 148/527 |
| 5,510,995 | 4/1996 | Oliver | 364/474.24 |
| 5,527,034 | 6/1996 | Ashcraft et al. | 473/330 |
| 5,572,430 | 11/1996 | Akasaka et al. | 364/486.01 |
| 5,581,672 | 12/1996 | Letcher, Jr. | 395/120 |

OTHER PUBLICATIONS

"The use of product–based projects for effective learning and research in CAD/CAM" S.T. Newman et al., Apr, 1995, pp. 74–80.

*Primary Examiner*—Kevin J. Teska
*Assistant Examiner*—A. S. Roberts
*Attorney, Agent, or Firm*—McAulay Fisher Nissen Goldberg & Kiel, LLP

[57] ABSTRACT

A method for the design of a golf club head includes the selection, by the designer, of dimensions which define the basic shape of the golf club head. Once the basic shape of the club head is defined, critical points on the golf club head may be located. Once the basic shape and the critical points are known, a model of the basic shape may then be displayed. In addition, the method may further include the selection of desired mass properties, types of mass constraints and back-weighting parameters, all of which are determined by the designer. These specifications, in addition to the basic shape of the club head permit the design of back-weighting of the club head. Once the back-weighting has been designed, the final solid model of the golf club head, which includes the basic shape and back-weighting, may be displayed. In achieving the final solid model, the designer may employ finite element solid modeling methods, optimization algorithms, geometric influencing, and modification of the original criteria specified by the designer. The system which is used to perform the method, includes a computer loaded with a basic shape program and a finite element solid modeling program. The computer is also connected to a display. When the computer operates the basic shape program, the user-specified dimensions are retrieved and the locations of the critical points are determined. The computer then operates a finite element solid modeling program to retrieve the dimensions and critical points to then display the basic shape model. In addition, the computer includes a back-weighting program. When the computer operates the back-weighting program, the mass properties, types of mass constraints, and back-weighting parameters which were selected by the designer are retrieved and the critical points concerning the back-weighting are located. The computer then employs the finite element solid modeling and analysis program to display a final back-weighted solid model of a completed golf club head.

19 Claims, 17 Drawing Sheets

Microfiche Appendix Included
(3 Microfiche, 35 Pages)

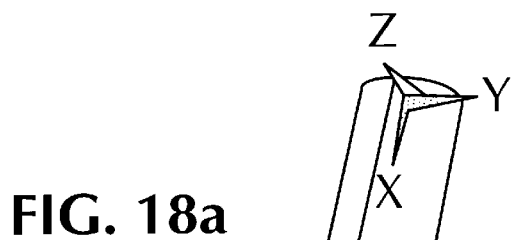
FIG. 18a
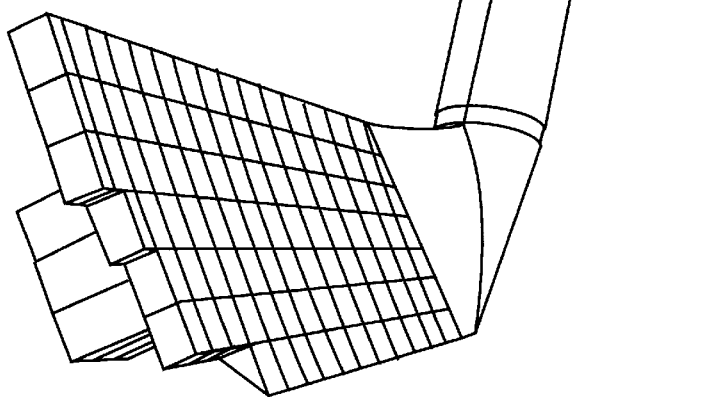
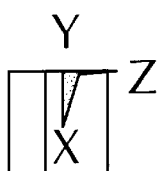
FIG. 18b
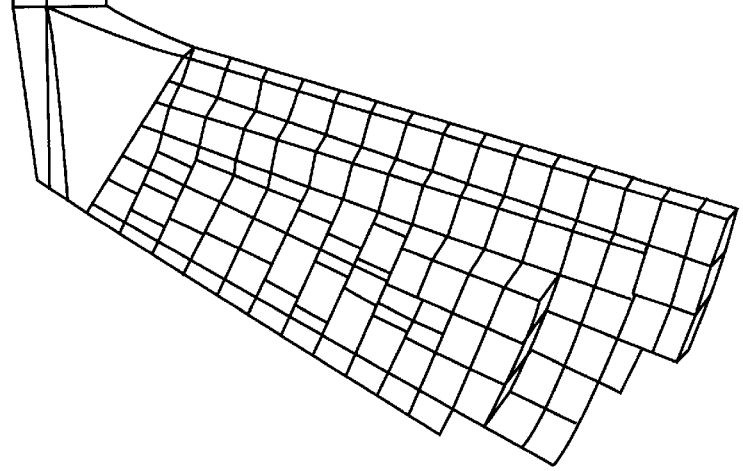

ANALYTICAL METHOD AND SYSTEM FOR THE DESIGN OF IRON CLUB HEADS

BACKGROUND OF THE INVENTION

This invention relates to the design of the heads of golf club irons. More particularly, this invention relates to the design of the heads of golf club irons by employing computer methods and modeling plus the optimization of parameters based upon desired characteristics specified by the operator.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A microfiche appendix consisting of 3 microfiche sheets having a total of 35 frames is included as part of the specification. The microfiche appendix includes computer program listings for the basic shape program and the back-weighting program.

The previously unpublished textual work entitled "Design of a Dynamically Matched Set of Iron Golf Clubs" authored by Terry Hartzell, is the subject matter of an application executed on Jun. 13, 1995 to register copyright in the United States Copyright Office. The subject matter of this work is incorporated into the present specification by reference and is referred to hereinafter as "Hartzell, 1994."

The mass properties of a golf club head play an important role in the golf shot. These mass properties include: the overall mass, the three coordinates of the mass center location ($X_m$, $Y_m$, $Z_m$) and the six elements of the inertia tensor ($I_{xx}$, $I_{XY}$, $I_{xz}$, $I_{YY}$, $I_{YZ}$, $I_{zz}$). (The inertia tensor is a 3×3 matrix which represents the mass moments of inertia of a solid body in three dimensions. While the inertia tensor has nine elements, the 3×3 matrix is diagonally symmetric, thus, only six of the elements are independent.) The mass properties influence both the golfer and the outcome of the shot in many ways. Specifically, they can affect the swing of the golfer, the energy transfer at impact, the behavior of the club while swinging and during impact, and how the golfer feels the impact. The general relationships between these quantities and their affect on the golf shot are widely recognized and discussed extensively in golf literature.

When designing the heads of golf club irons, the designer approaches his task having a general idea of a basic shape and the desired mass properties. While the designer has direct control over the geometry of the club head, obtaining the desired mass properties is very difficult, if not impossible, for two reasons: 1) the values of the mass properties are not readily apparent from visual inspection, and 2) no present design method exists that configures the club head based upon the specified mass properties. Therefore, only after a club head design is completed does the designer know through solid modeling or direct measurement if the desired mass properties have been obtained. (Solid modeling is defined as the graphical representation of a solid body using a computer such that it is geometrically and physically equivalent to the original body. A variety of computer analyses can be performed on the solid model with the results representative of the original body; for example, determination of the mass properties of a solid body.) The design process then becomes iterative in reaching the desired mass properties Of the ten mass properties mentioned above, meeting the desired mass and mass center location is intuitive and an experienced designer can accomplish this quite well although to a limited degree of accuracy. When it comes to the elements of the inertia tensor, a very important parameter with respect to impact behavior, the designer at best can only influence the values of the elements. It is a near impossibility that the designer actually achieve the desired values. Therefore, club designers only consider general guidelines for inertia values. Further compounding the problem is the interdependence of all the mass properties on each other. Changing one of the mass parameters will almost certainly have an effect on many of the others. An additional burden is the constraint of iron club set matching such as swing weight and/or frequency matching.

Accordingly, it is an object of the present invention to provide a method for the design of a golf club head.

It is also an object of the present invention to provide a system for the design of a golf club head.

A further object of the present invention is to provide a scientific analytical method for the design of golf club heads which allows the designer to specify various mass properties for the club head and create club heads which meet the mass properties specified.

It is also an objective of the present invention to provide a tool for the design of the basic shape of golfclub heads based upon geometric specifications of the club face and hosel sections as established by the designer.

It is an objective of the present invention to provide the designer with control over the geometric and mass properties of the golf club head design.

An additional objective of this invention is to provide for the design of iron golf club heads based upon user-specified golf club head mass properties which include any or all of the following: the mass, the three coordinates of the mass center location, and the six components of the inertia tensor.

It is an additional object of the present invention to provide a method for the design of golf club heads which allows the designer to consider and specify mass moments of inertia including cross-products of inertia (the cross-products of inertia (Ixy, Ixz, Iyz) are the off-diagonal terms of the inertia tensor, and are generally ignored in the design of iron golf club heads).

An additional objective of this invention is to allow the designer to significantly increase the precision to which the mass properties are specified and ultimately obtained in the design.

It is also an objective of this invention to provide a method and a tool for implementing the method which establishes the configuration of the club face-hosel blend section to yield a smooth transition between the club face and hosel sections.

It is a further objective of this invention to provide a method for the control of the shape of the back-weighting of a golf club to develop a variety of designs.

It is also an objective of this invention to provide a method for designing a variety of dynamically equivalent golf club heads, i.e., club heads with similar mass properties, yet different shapes and geometries.

It is also an object of the present invention to provide the designer with a method for creating a set of club heads that are "matched" (equivalent) or have a predefined relationship to each other with respect to one or more of the mass properties in creating a set of golf clubs as in a set of irons.

Additionally, the present invention provides a graphical means for evaluating the designs of golf club heads.

It is also an object of the present invention to minimize costs and the time associated with the evaluation of a club design by providing a tool for the evaluation of a golf club head design prior to the construction of an actual club head.

In addition, the present invention provides a format from which to directly manufacture the club head as if utilizing a computer-numerical-control (CNC) machine in conjunction with suitable computer-aided-manufacturing (CAM) software.

As a further objective, the invention provides the designer control over the geometric and mass properties of irregularly shaped solids.

A method for the design of a golf club head according to the present invention includes the selection, by the designer, of dimensions which define the basic shape of the golf club head. Once the dimensions which define the basic shape of the club head are known, critical points on the golf club head may be located. Once the dimensions of the basic shape and the locations of the critical points are known, a model of the basic shape may then be displayed.

In addition, the method according to the present invention may further include the selection of desired mass properties, types of mass constraints and back-weighting parameters, all of which are determined by the designer. These specifications, in addition to the basic shape of the club head, permit the design of the back-weighting of the club head. Once the back-weighting has been designed, the final solid model of the golf club head which includes the basic shape combined with the back-weighting may be displayed via a computer terminal.

The dimensions which are originally selected by the designer to define the basic shape include full length of the hosel, length of the straight section of the hosel, outer diameter of the hosel at the junction with the club shaft, inner diameter of the hosel, outer diameter of the hosel at the base, rake angle of the club face, angle between the shaft and the bottom edge of the club face, inside height of the club head, outside height of the club head, total length of the club face, length of the bottom edge of the club face, thickness of the club face at the top, thickness of the club face at the bottom, club face bottom edge radius, club face top edge radius, and club face outer radius.

The critical points which are located and which are critical to the design and display of the basic shape include the connection points between the rounded end section and the straight section of the club face (P1 through P4), the locations of the centers of curvature for the end section of the club face (RP1, RP2, RP3), the connection points between the club face and the blend section (P5 through P8), the locations where the blend section joins the lower portion of the hosel (P9 through P12), and the points which locate the bottom, top, and beginning of the tapered section of the hosel (P13, P14, P15).

The desired mass properties which are selected by the designer may include any one or any combination of the following: overall mass, the mass center X-coordinate, the mass center Y-coordinate, the mass center Z-coordinate, and each of the six elements which make up the inertia tensor.

The mass constraints may be specified as either equality constraints or inequality constraints.

The back-weighting parameters which are specified by the designer include: the volume brick size, the minimum brick height, the maximum brick height, and the initial brick height (initial conditions).

The critical points which are required to create and display the back-weighting include: the points that define the profile of the club face within which the back-weighting is configured (P1 through P8, RP1, RP2, and RP3), the four corners of the bottom of each volume brick located within the plane of the club face boundary (PB1(I,J) through PB4(I,J) where I (row) and J (column) are the indices that locate each brick), and the four corners of the top of each brick (PT1(I,J) through PT4(I,J)).

In achieving the final solid model, the designer may employ finite element solid modeling methods, optimization algorithms, geometric influencing, and modification of the original criteria specified by the designer in order to obtain a different solid model.

The system which is used to perform the method according to the present invention, includes a computer loaded with a basic shape program and a finite element solid modeling and analysis program. The computer is also connected to a display. When the computer operates the basic shape program, the user-specified dimensions are retrieved from an input means such as a keyboard, computer disk drive, etc., as are known in the art. The computer, operating the basic shape program, then locates critical points on the club head. The computer then operates the finite element solid modeling and analysis program to retrieve the dimensions and critical points to then display a basic shape model. The display may include a video monitor or a printer. In addition, the computer includes a back-weighting program. When the computer operates the back-weighting program, the mass properties, types of mass constraints, and back-weighting parameters which are selected by the designer are retrieved from the input means and locations of critical points concerning the back-weighting are determined. The computer then employs the finite element solid modeling and analysis program to display a final back-weighted solid model of a complete club head on the display.

Briefly, the invention provides a method of creating and evaluating the geometric and dynamic characteristics of a golf club head design by employing computer methods and modeling plus mass property optimization.

These and other objects and advantages of the invention will become more apparent from the following description taken in conjunction with the accompanying drawings wherein:

FIG. 7b illustrates a rear perspective plot of the design illustrated in FIG. 7a;

FIG. 9b illustrates a rear perspective plot of the design illustrated in FIG. 9a;

FIG. 10b illustrates a rear perspective plot of the design illustrated in FIG. 10a;

FIG. 15b illustrates a rear perspective plot of the design illustrated in FIG. 15a;

FIG. 16b illustrates a rear perspective plot of the design illustrated in FIG. 16a;

FIG. 17b illustrates a rear perspective plot of the design illustrated in FIG. 17a;

FIG. 18a illustrates a front perspective plot of a solid model in which the back-weighting was designed employing the concentric ring constraint method of geometric influencing;

FIG. 18b illustrates a rear perspective plot of the design illustrated in FIG. 18a;

FIG. 19a is a plot similar to FIG. 15a, however, the initial conditions are different from those used to achieve the plot of FIG. 15a;

FIG. 19b illustrates a rear perspective plot of the design illustrated in FIG. 19a.

FIG. 20a is a plot similar to FIG. 18a, however, the cross-sectional area of the bricks is decreased from that of FIG. 18a;

FIG. 20b illustrates a rear perspective plot of the design illustrated in FIG. 20a.

PROCEDURE

Figure 1:
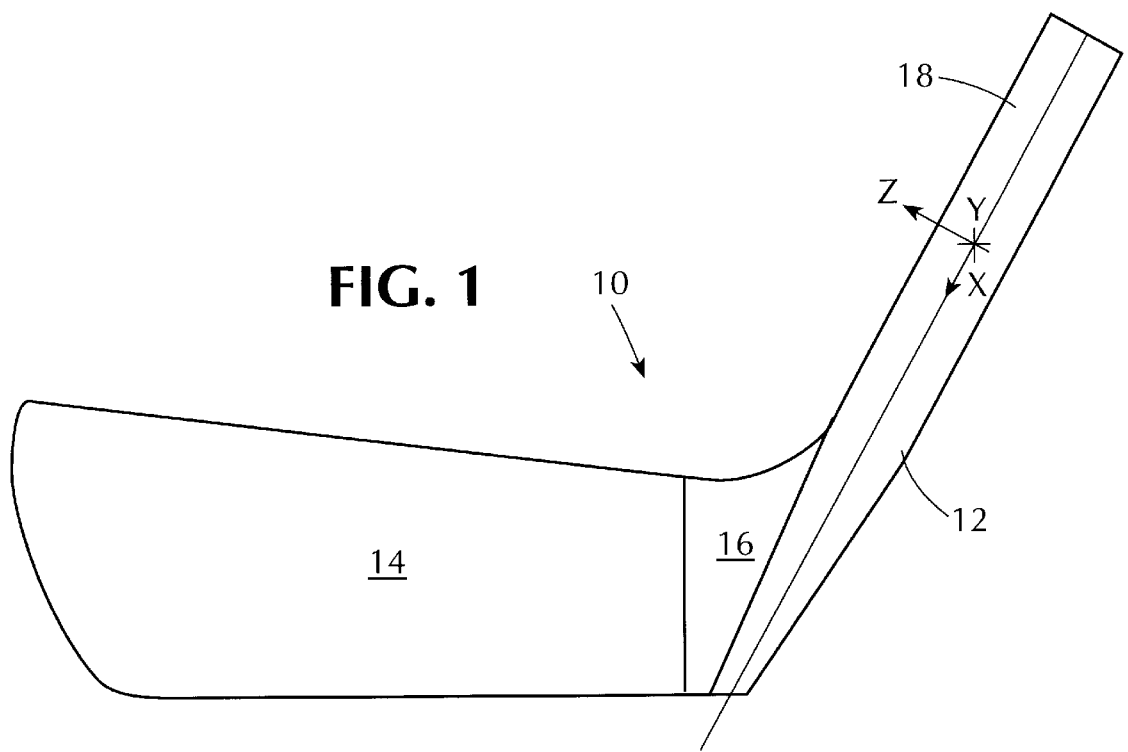
FIG. 1 is a front plan view of a golf club head portion showing the components of the basic shape of a golf club head plus the global coordinate system.

A method according to the present invention provides for the design of iron golf club heads using sequential steps. First, the designer selects geometric specifications which define a basic shape of a club head. For example, the user specifies the following dimensions and supplies them to a computer operating a basic shape program: full length of the hosel (Lh); length of the straight section of the hosel (Ls); outer diameter of the hosel at the junction with the club shaft (Ds); inner diameter of the hosel (Di); outer diameter of the hosel at the base (Db); rake angle of the club face ($\theta$r); angle between the shaft and the bottom edge of the club face ($\theta$g); inside height of the club head (Hi); outside height of the club head (Ho); total length of the club face (Lt); length of the bottom edge of the club face (Lb); thickness of the club face at the top (Tt); thickness of the club face at the bottom (Tb); club face bottom edge radius (Rb); club face top edge radius (Rt); and, club face outer edge radius (Ro). Using the geometric data supplied by the user, the basic shape of the club head may be illustrated for evaluation thereof Since no further modifications to the hosel and blend sections are necessary, solid models for each may be created. Since back-weighting of the club face must still be determined, only an outline model of the club face is created.

The designer must also specify the desired mass properties. The mass properties may be specified either before or after the basic shape is illustrated and may include any one or any combination of the following: the overall mass, the mass center X-coordinate, the mass center Y-coordinate, the mass center Z-coordinate, and each of the six elements which make up the inertia tensor. Material properties such as: the modulus of elasticity of the hosel; the density of the hose) the Poisson's ratio of the hosel, the modulus of elasticity of the club face; the density of the club face; and, the Poisson's ratio of the club face must also be provided by the user.

An optimization routine is employed to configure the club head back-weighting to match the desired mass properties for the golf club head. Since the front face of the club head must be flat to accommodate contact with the ball, the mass properties are altered b modifying the mass associated with the structure behind the club face. The structure behind the club face added to meet the specified mass properties is referred to herein as back-weighting. The designer can control the shape of the back-weighting with geometric influencing. For example, the designer may place geometric constraints on the back-weighting to produce a perimeter weighted type club head.

Several different dynamically equivalent designs can be created through the use of different initial conditions on the optimization routine and different specifications for geometric influencing. A finite element solid modeling and analysis program (also referred to as FEA program) is used to create outline and solid models of the club head during both stages of the design process for visual inspection and verification.

DESIGN OF THE BASIC SHAPE OF THE GOLF CLUB HEAD

The design of the basic shape of the club head is accomplished first. In one embodiment, the basic shape is created directly from user defined geometric specifications. For example, the designer selects the following dimensions and supplies them to the computer operating the basic shape program: full length of the hosel (Lh); length of the straight section of the hosel (Ls); outer diameter of the hosel at the junction with the club shaft (Ds); inner diameter of the hosel (Di); outer diameter of the hosel at the base (Db); rake angle of the club face (θr); angle between the shaft and the bottom edge of the club face (θg); inside height of the club head (Hi); outside height of the club head (Ho); total length of the club face (Lt); length of the bottom edge of the club face (Lb), thickness of the club face at the top (Tt); thickness of the club face at the bottom (Tb); club face bottom edge radius (Rb); club face top edge radius (Rt); and, club face outer edge radius (Ro). The designer employs a computer operating a computer program (herein referred to as the basic shape program) to create the basic shape of the club head.

Referring to FIG. 1, the basic shape of golf club head portion 10 includes hosel 12, club face 14, and club face-hosel blend section 16. (The club face-hosel blend section is also herein referred to as the blend section.) The hosel 12 is connected to the club face 14 by the blend section 16. The golf club head portion 10 is connected to the club shaft 18 at the hosel 12 to construct a golf club. Notably missing from the basic shape is the back-weighting which is configured in a subsequent step.

The location and orientation of the global coordinate system which is at the top of the hosel with the X-axis pointing down along the center line of the hosel is illustrated on FIG. 1. The XZ plane is defined to be parallel with the bottom edge of the club face, with the Z-axis pointing towards the outer edge of the club head. The Y-axis completes a right-handed coordinate system.

Figure 3A:
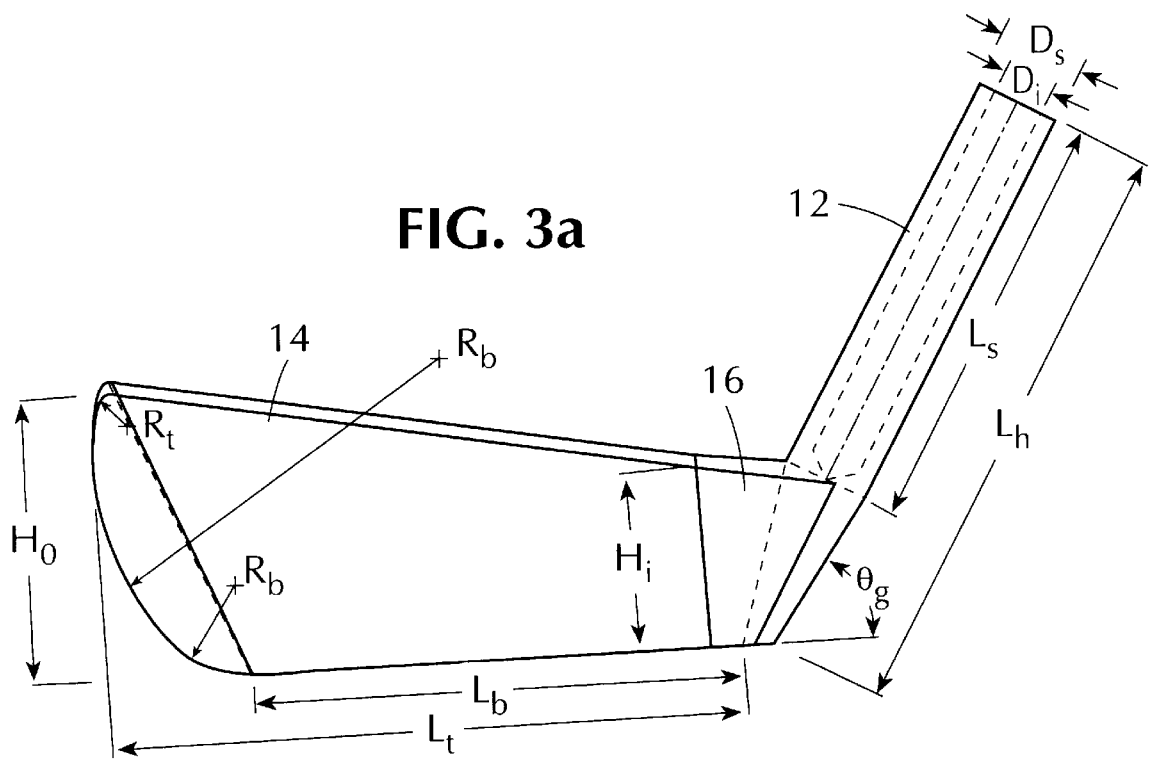
FIG. 3a is a front perspective view of a golf club head showing dimensions specified by the user for the design of the basic shape.
Figure 2:
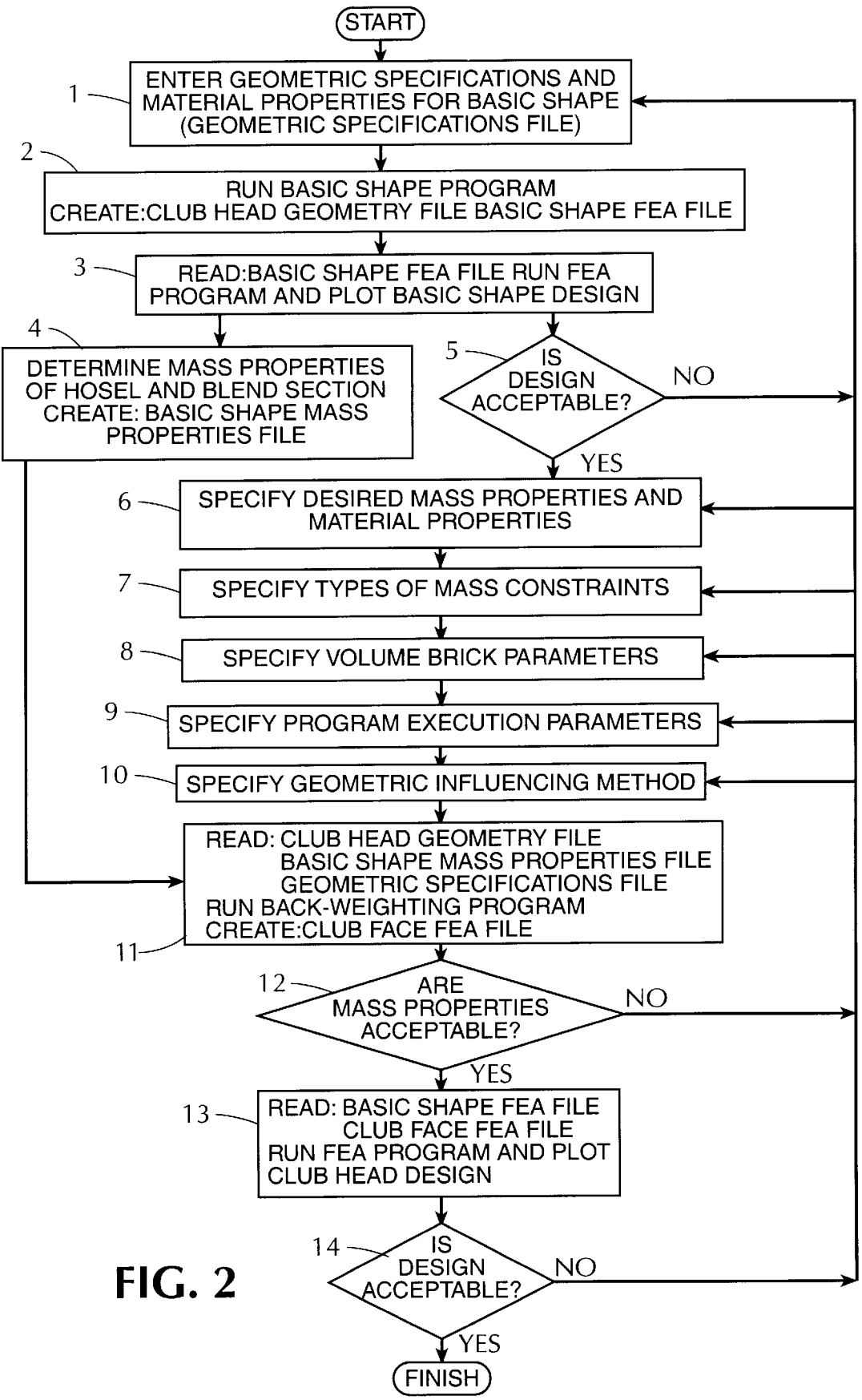
FIG. 2 is a flow chart which schematically illustrates the design of a golf club head in accordance with this invention.
Figure 3B:
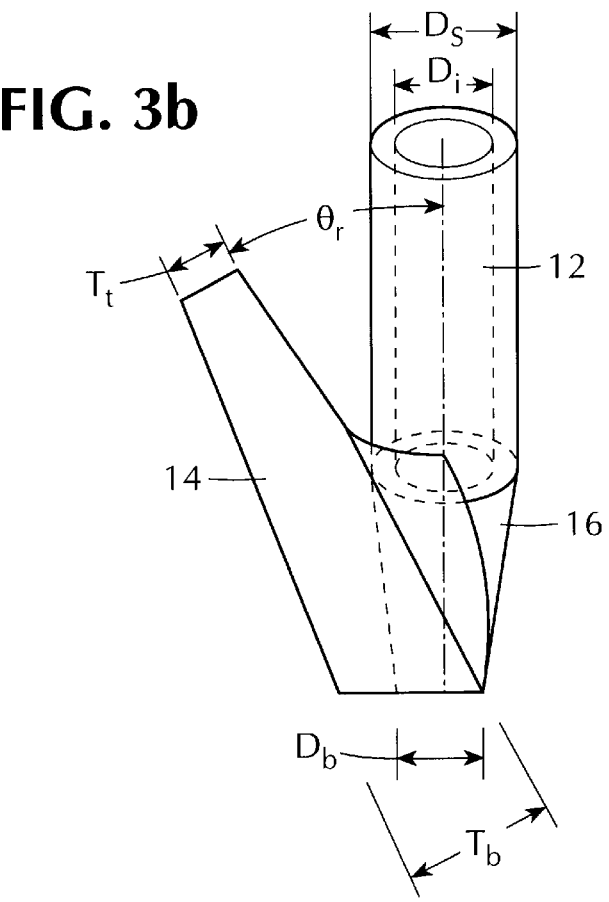
FIG. 3b is a side perspective view of a golf club head showing dimensions specified by the user for the design of the basic shape.
Figure 4:
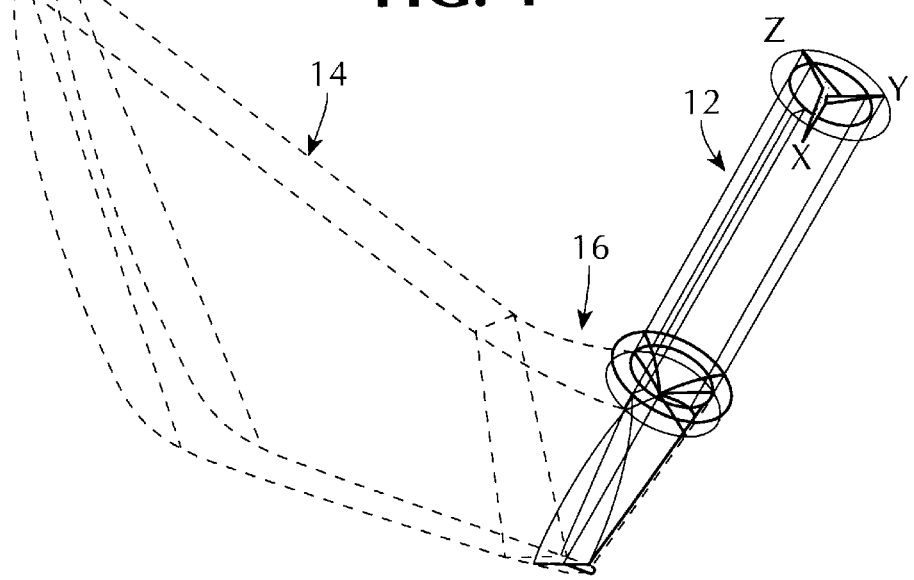
FIG. 4 illustrates a plot of the outline of the entire basic shape.
Figure 5:
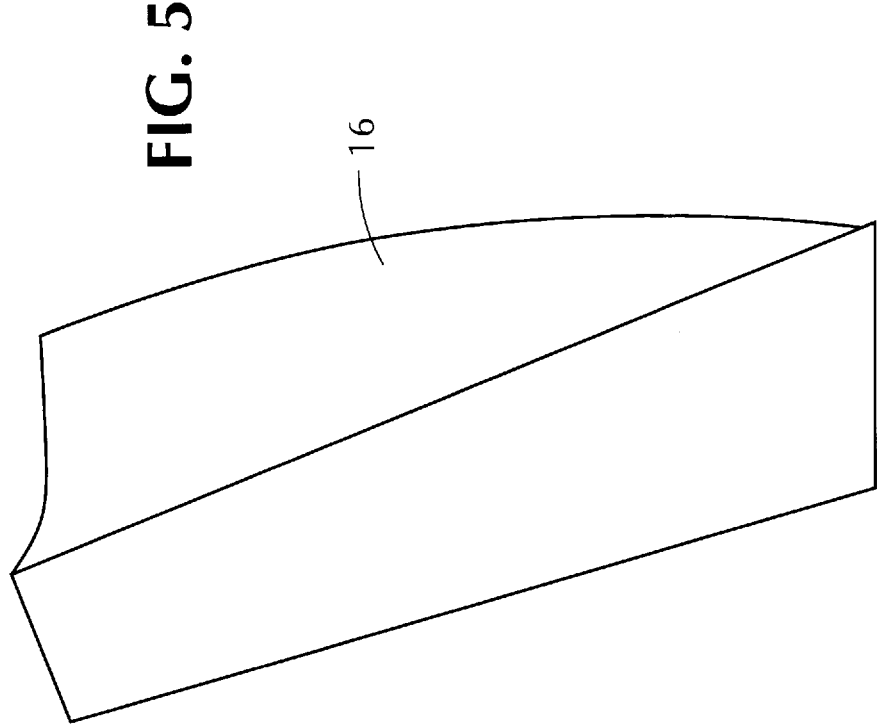
FIG. 5 illustrates a plot of the solid model of the blend section.
Figure 22:
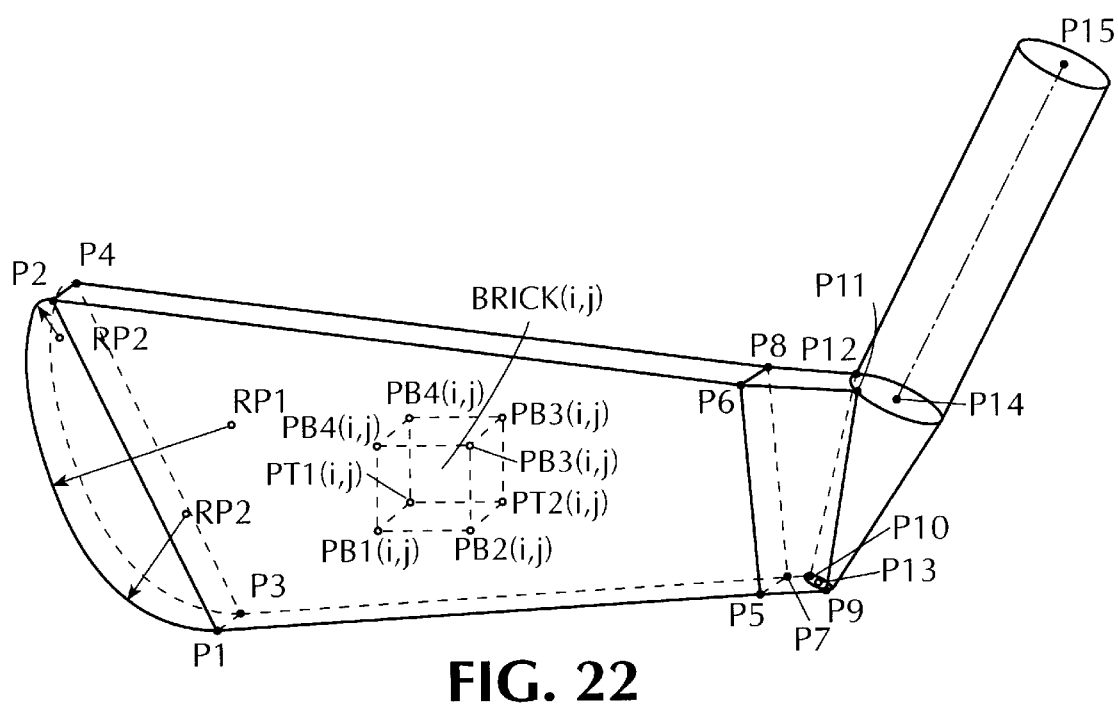
FIG. 22 is a front perspective view of a golf club illustrating the location of several critical points.

Referring to FIG. 2, a flow chart of the method for designing the basic shape and back-weighting of a golf club head is illustrated. The user enters the desired geometric specifications for the club face and hosel (step 1—FIG. 2) as shown in FIGS. 3a and 3b. The computer file containing these dimensions is referred to herein as the geometric specifications file. In one embodiment, a computer operating the basic shape program retrieves the geometric specifications file and locates critical points to configure the club face and hosel (step 2—FIG. 2). Referring to FIG. 22, the critical points that are located include P1 through P15, and RP1, RP2, and RP3. From these located points, the outlines of these sections are created (FIG. 4, shown with blend section also). The computer operating the basic shape program then creates the blend section to join the club face and hosel. The blend section is created by defining smooth splines utilizing points from the lower hosel section and the edge of the club face section. The points on the lower hosel section and on the edge of the club face include P5 through P12. These splines outline a volume that smoothly blends the two sections together (FIG. 5).

The computer operating the basic shape program also locates several of the critical points on the club face required by the back-weighting program to define the boundaries within which the back-weighting is configured. The critical points necessary from the basic shape for the configuration of the back-weighting include P1 through P8, and RP1, RP2, and RP3. This information is stored in a computer file which is herein referred to as the club face geometry file.

Figure 6:
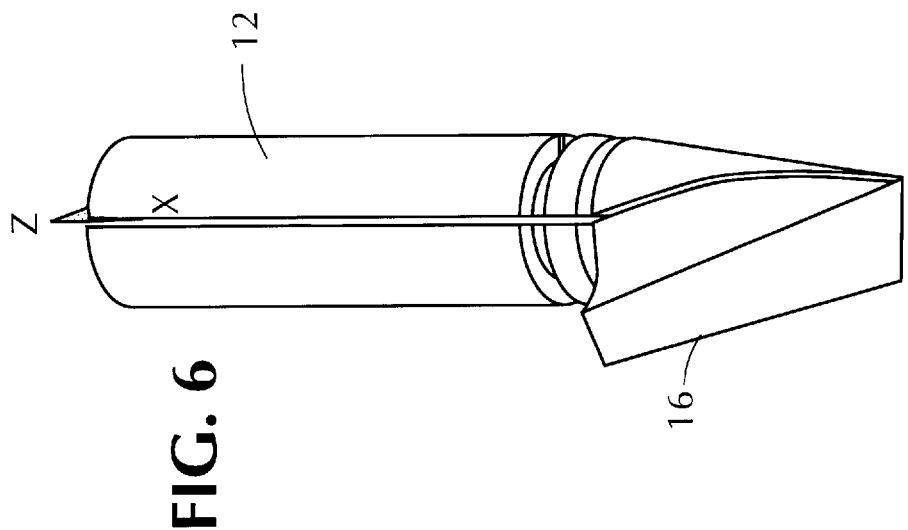
FIG. 6 illustrates a plot of the solid model of the hosel and blend section.

The computer operating the basic shape program also utilizes the geometric specifications and located critical points to create a computer file of modeling commands compatible with an FEA program to create the solid models of the hosel and blend sections (FIG. 6). This file is herein referred to as the basic shape FEA file.

Figure 7A:
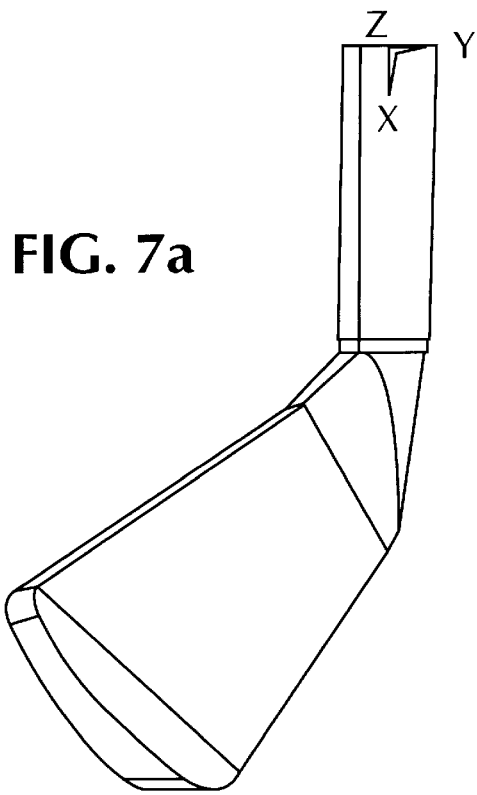
FIG. 7a illustrates a front perspective plot of the basic shape of a club head design consisting of an outline model of the club face and a solid model of the hosel and club face-hosel blend section.
Figure 7B:
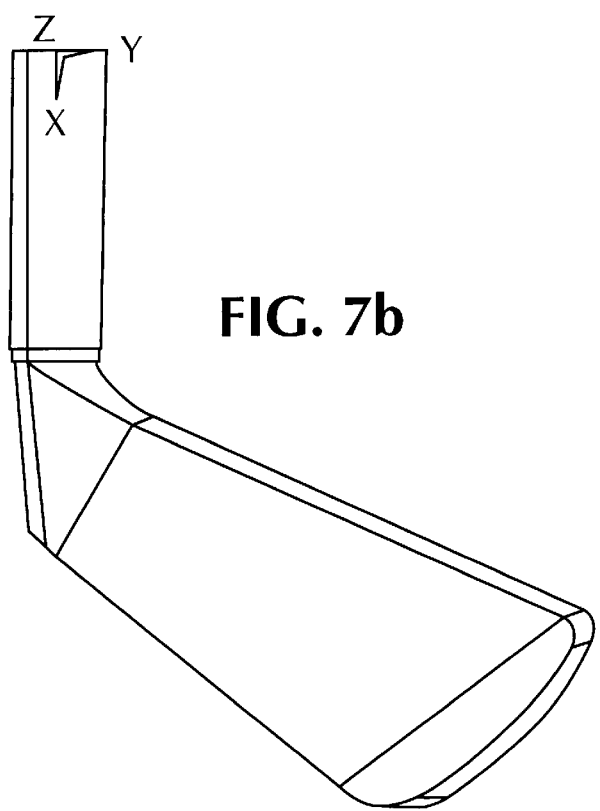

The FEA program is then operated (step 3—FIG. 2) on a compatible computer. The computer, while operating the FEA program, retrieves the basic shape FEA file having the modeling commands and plots a combination outline and solid model of the basic shape of the club head (FIG. 7) for visual inspection by the operator. The computer, while operating the FEA program, also extracts the mass properties of the combined hosel and blend section from the solid model (step 4—FIG. 2). This alleviates the difficult task of determining the mass properties of these irregularly shaped sections using analytical techniques. The mass property information is stored in a computer file (basic shape mass properties file) for later access by the computer during operation of the back-weighting program.

The designer visually inspects the plot of the basic shape (step 5—FIG. 2) for: 1) overall geometry and aesthetics, and 2) to see if the club face is of reasonable size and shape to accommodate the back-weighting. If the design of the basic club head is unacceptable to the designer, he may modify his original geometric specifications and create a new geometry which accounts for the changes made. Once acceptable, the design of the basic shape of the club head is complete for now, and the design of the back-weighting may proceed.

Since the back-weighting of the golf club head has not yet been designed, the club head is, for evaluation of the basic shape, illustrated as having a back face comprising a plane which is defined by the thickness of the club face at the top (Tt) and the thickness of the club face at the bottom (Tb) as defined by the user.

DESIGN OF THE BACK-WEIGHTING OF THE GOLF CLUB HEAD

Once an acceptable basic shape is created, the back-weighting of the club head is designed. The computer operates the back-weighting program to configure the back-weighting of the club head to meet the desired mass properties specified by the designer. First, the designer selects the desired mass properties for the entire club head and the club face material (step 6—FIG. 2). The designer can specify any or all of the following mass properties: the total mass, the three coordinates of the mass center location of the club head, and the six elements of the inertia tensor. The mass properties are specified relative to the global coordinate system and can be qualified as either equality mass constraints (eg., mass=1.5 lbs) or inequality mass constraints (eg. mass<1.5 lbs) (step 7—FIG. 2).

The mass properties and the club face material, as well as, the specifications concerning the geometry of the volume bricks (also referred to as bricks) which make up the back-weighting (FIG. 8) are entered into the computer which operates the back-weighting program (step 8—FIG. 2). The volume brick specifications (also referred to as the back-weighting parameters) include cross-sectional area (i.e., length and width), minimum and maximum heights, initial heights (initial conditions), and geometric influencing method. (Brick height refers to the brick dimension perpendicular to the club face.) Program execution parameters must be specified and include error tolerances and iteration limitations (step 9—FIG. 2). The error tolerances define the allowable difference between the desired mass properties and the actual mass properties in determining if an acceptable design has been achieved. The iteration limitations specify the maximum number of solutions the program will execute in attempting to obtain the desired mass properties.

The computer, while operating the back-weighting program (step 11—FIG. 2), retrieves the club face geometry file, the basic shape mass properties file, and the geometric specifications file. The computer, while executing the back-weighting program, subdivides the club face into volume bricks having two dimensions within the boundaries of the club face. An optimization algorithm is then used to adjust the back-weighting of the club head by varying the height of the individual bricks until the desired mass properties are achieved or the program execution limitations have been reached. As the optimization algorithm adjusts the height of each individual brick, the mass properties of each brick are calculated using standard analytical methods. The mass properties of each volume brick are summed about a global coordinate system and then combined with the mass properties of the hosel and blend section to obtain the mass properties of the entire club head about the global coordinate system. The overall shape of the back-weighting can be controlled by the method of geometric influencing (step 10—FIG. 2) which constrains the relative heights of adjacent bricks to influence the final shape of the back-weighting (FIGS. 11 through 14).

Once the optimization function is complete, the mass properties of the entire club head are reviewed by the designer (step 12—FIG. 2). If unacceptable results are obtained, the designer may modify one or more of the following parameters: desired mass properties, number and type of mass constraints, geometric influencing method, program execution parameters, initial conditions, and/or volume brick size. Further modification options are possible by alteration or re-design of the basic shape.

The computer, while operating the back-weighting program, uses the coordinate locations of the corners of the volume bricks to define finite element volumes for the solid model of the back-weighting and the club face. The computer then writes a file of finite element commands necessary to create a solid model of the back-weighting and club face. This file is herein referred to as the club face FEA file. The club face FEA file is read into the computer operating the FEA program (step 13—FIG. 2) where it is combined with the previously defined solid model of the hosel and blend section to create the solid model of the entire club head (see FIG. 15 for an example). The designer can then visually evaluate the club head design to determine whether the shape and the back-weighting are acceptable (step 14—FIG. 2). If desired, the designer may alter the back-weighting design or overall club head design by modification of the parameters as discussed previously.

METHOD

The Design of the Basic Shape of the Club Head

The design of the basic shape which consists of the club face, hosel, and club face-hosel blend section is accomplished first. The basic shape is configured from user supplied geometric specifications. The user specifies dimensions for the hosel and club face and the computer, loaded with the back shape program, configures these sections directly from the specifications supplied. The computer operating the basic shape program calculates the geometry of the blend section to smoothly join the club face and hosel. The computer outputs outline and solid modeling information which is compatible with a plotting program (FEA program), so that the computer operating the FEA program, plots the basic shape to permit visual inspection thereof Design modification is achieved through direct manipulation of the geometric specifications.

Referring to FIGS. 3a and 3b, the designer supplies the following dimensions to the computer operating the basic shape program: full length of the hosel (Lh); length of the straight section of the hosel (Ls); outer diameter of the hosel at the junction with the club shaft (Ds); inner diameter of the hosel (Di); outer diameter of the hosel at the base (Db); rake angle of the club face ($\Theta$r); angle between the shaft and the bottom edge of the club face ($\Theta$g); inside height of the club head (Hi); outside height of the club head (Ho); total length of the club face (Lt); length of the bottom edge of the club face (Lb); thickness of the club face at the top (Tt); thickness of the club face at the bottom (Tb); club face bottom edge radius (Rb); club face top edge radius (Rt); and, club face outer edge radius (Ro).

In addition, the designer supplies the following material properties: the modulus of elasticity of the hosel; the density of the hosel; the Poisson's ratio of the hosel; the modulus of elasticity of the club face; the density of the club face; and, the Poisson's ratio of the club face.

Using standard methods of spacial geometry, the critical point locations on the club face and hosel are determined directly from the geometric specifications (P1 through P15, and RP1, RP2, and RP3) (See Hartzell, 1994, for the details of the geometric methods and calculations). These points are utilized to create an outline of the basic shape by a combination of straight lines tangents, constant radius arcs, circles, and smooth splines (FIG. 4). Other points (not shown) are used to locate and define local coordinate systems (not shown) which aid in locating critical points and defining curved lines. The lines, arcs, circles, and tangents are combined to define enclosed areas, which in turn are used to define enclosed volumes. These areas and volumes are necessary components for the creation of the solid models of the hosel and the blend sections (FIG. 6). It is sufficient to define the club face with an outline at this point, since the solid model is created during the design of the back-weighting. Selected points from the basic shape are captured and stored for later use when designing the back-weighting as they define the planar boundaries within which the back-weighting must fit (P1 through P8 and RP1, RP2, and RP3).

While the club face and hosel are designed directly from geometric specifications, the club face-hosel blend section is configured indirectly from the resulting size and shape of the club face and hosel. The blend section is designed to be a smooth transitional piece from the club face to the hosel (FIG. 5). As such, once the critical locations on both the hosel and the club face have been determined (P5 through P13), smooth splines are used to join the two pieces. These splines plus the interface areas of the joining sections define the outline of the blend section. If the designer wishes to alter the blend section, changes must be made to the geometric specifications to either or both the hosel and club face. The effects of these changes on the resulting blend section are somewhat intuitive.

The points, lines, areas, and volumes defined and located for the basic shape are used to write a file of FEA program specific commands to define the outline of the basic shape and the solid models of the hosel and the blend sections. Preferably, the FEA program is ANSYS, a product of Swanson Analysis, Inc. However, any user written or commercially-available software package that is capable of basic outline and solid modeling as well as determining the mass properties of the solid model can be used, although modifications to the basic shape program will be required with respect to the writing of software specific modeling commands.

Figure 8:
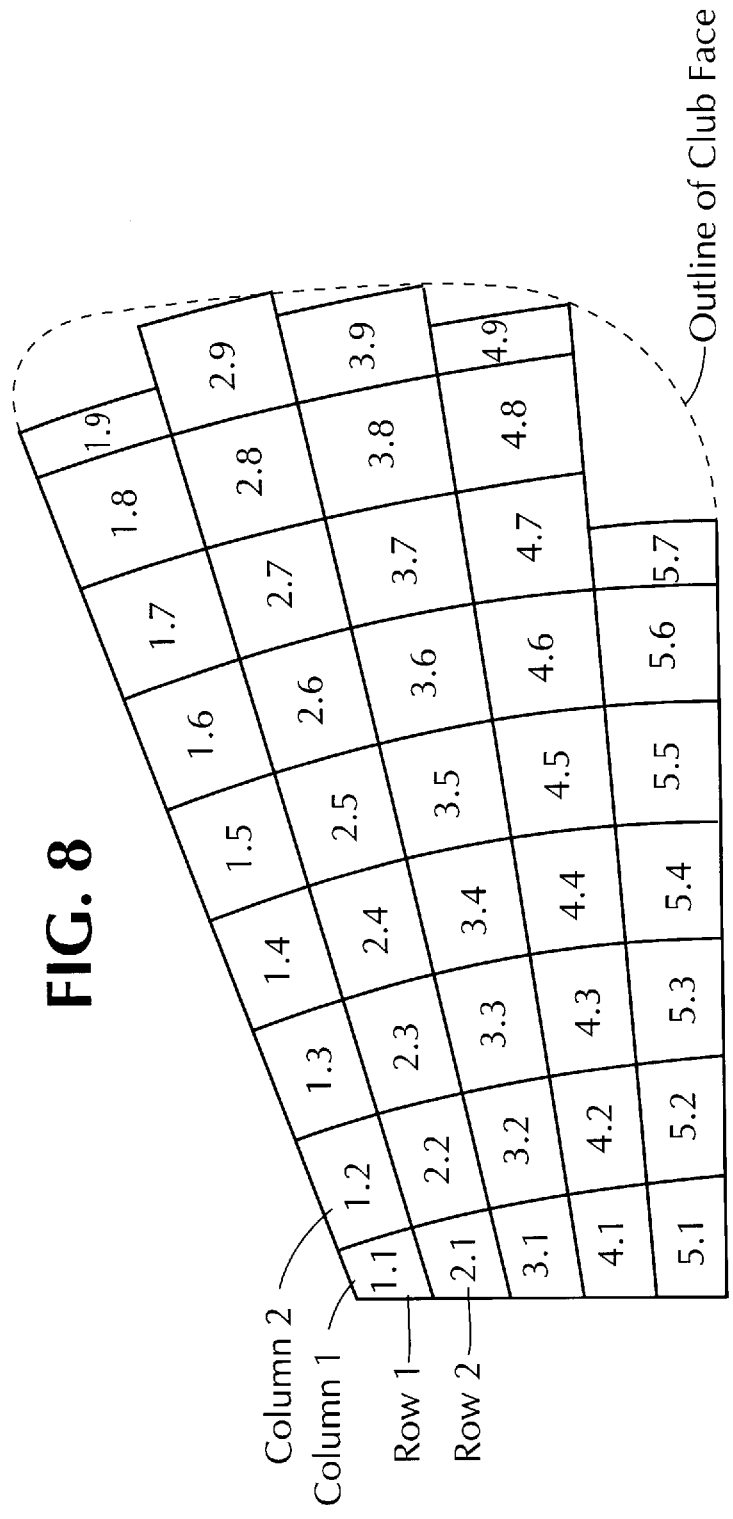
FIG. 8 is a planar plot of the back of a club face illustrating the subdivision thereof into volume bricks.

The computer operating the FEA program reads in the file of FEA commands for the basic shape and plots the club face outline model, the hosel solid model, and the blend section solid model (FIGS. 4 through 7). The plots allow for detailed visual inspection of the basic shape. The computer operating the FEA software also determines the mass properties of the combined hosel and blend section solid model relative to the global coordinate system. Development of accurate analytical methods to determine the mass properties of the hosel and blend sections would be extremely difficult, thus the computer operating the FEA software is used to do these calculations. The mass properties are stored to be later utilized by the computer while operating the back-weighting design program. Evaluation of the design of the basic shape is done visually. The main criteria are aesthetics and that the club face provides an adequate profile for designing the back-weighting (FIG. 8). While the mass properties of the combined hosel and blend section can be reviewed, it is not normal to reject a design at this point based upon their values. The design of the basic shape is complete for now, unless the designer wishes to further modify the design based upon the criteria mentioned above. Design modification is accomplished through direct alteration of the geometric specifications. Redesign of the basic shape may become necessary to assist in obtaining the desired mass properties after the design of the back-weighting has been attempted.

The Design of The Back-Weighting of the Club Head

The second step in the design of the club head is the design of the back-weighting. Here, the designer specifies the desired mass properties (also referred to as target mass properties) for the entire club head and an optimization routine utilizing an adaptive random search algorithm configures the back-weighting to match the desired mass properties. The designer has control of the general shape of the back-weighting through geometric influencing. Several geometrically different but dynamically equivalent designs can be created through the use of different back-weighting parameters for the optimization routine and different specifications for the geometric influencing. Solid models of the entire club head are created and displayed to the designer for visual inspection.

Referring to FIG. 8, the process begins with the club face 14 being divided into volume bricks of a user-specified size within the boundaries of the previously designed club face profile. An optimization algorithm configures the back-weighting to match target mass properties by systematically changing the heights of the volume bricks. It is preferable that the optimization algorithm utilizes an adaptive random search method (ADRANS). The optimization algorithm is discussed in detail in Optimal Engineering Design, Sidall, 1982 (hereinafter referred to as "Sidall, 1982"). Accordingly, this text is incorporated herein by reference. The mass properties of the club head are calculated using standard analytical techniques (see Hartzell, 1994 for details) and compared to the target mass values through mass constraint equations and a penalty function. The variation of the heights of the bricks and the calculation of the mass properties continues until either the mass properties meet or converge as closely as possible to the target values.

Figure 21:
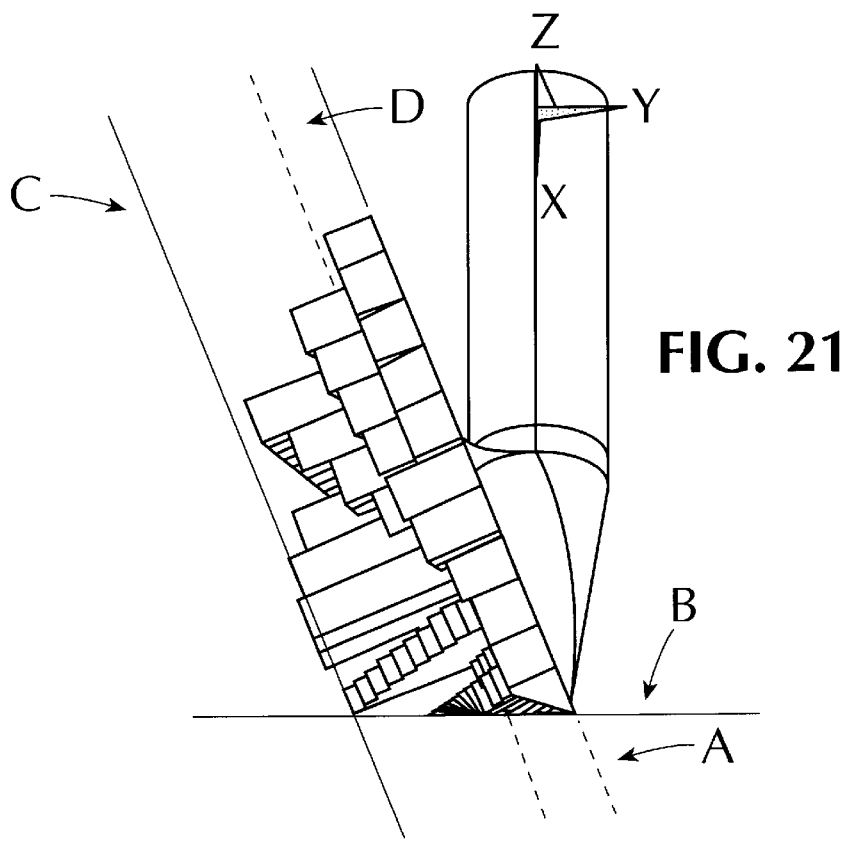
FIG. 21 is a side plan view showing the planar boundaries that confine the configuration of the back-weighting.

Referring to FIG. 21, the manner in which the volume bricks are varied relative to both the club face plane A and the ground plane B is illustrated. The maximum brick height plane C and the minimum brick height plane D show the limitations imposed upon the heights of the bricks as specified by the user.

The optimization algorithm may employ any combination of equality mass constraints and inequality mass constraints to define the target mass properties. Any one or all of the mass properties can be specified by the designer, thus resulting in as many as ten mass constraints. A penalty function is employed which incorporates the mass constraints in a manner that gauges the progress of the algorithm in reaching a solution.

The equality mass constraints employed by the optimization algorithm are of the form:

$$\Psi_i = \{(\text{Target Mass Value})i - (\text{Present Mass Value})i\} * C_E,$$

where $\Psi_i$ is the contribution to the penalty function from the jth target mass property, $C_E$ is a scaling factor that can be used to change the weight of an equality mass constraint in the penalty function, and i goes from 1 to the number of equality constraints specified (m). The present mass value represents the mass property value of the most recent program iteration.

Inequality mass constraints may be used in place of the equality mass constraints to specify desired mass properties. The inequality mass constraints are much less restrictive. Accordingly, many more potential designs may be permitted. The inequality mass constraints employed by the optimization algorithm take the form:

$\Phi_j = \{(\text{Target Mass Value})j - (\text{Present Mass Value})j\} * C_I$ if the desired inequality is false, or $\Phi_j = 0$ if the desired inequality is true, where $\Phi_j$ is the contribution to the penalty function from the jth target mass property, $C_I$ is a scaling factor that can be used to change the weight of an inequality mass constraint in the penalty function, and j goes from 1 to the number of inequality constraints specified (n).

The penalty function is used to direct the algorithm solution and to measure convergence. The penalty function may be selected from one of the following forms: the one pass external function, Fiacco-McCormick combined external and internal function, Powell's function, or Schuld's function (Sidall, 1982).

The one pass external function is preferred and is of the form:

$$\sigma = \sum_{i=1}^{m} \text{ABS}(\Psi_i) * C_1 + \sum_{j=1}^{n} \text{ABS}(\Phi_j) * C_2,$$

where $\sigma$ represents the value of the penalty function and where $C_1$ and $C_2$ are scalar factors to effect the change of the relative weights of the mass constraints. As the mass properties of the club head become closer to satisfying the mass constraints, the penalty function approaches zero, and thus, the algorithm is closer to a solution.

Figure 10A:
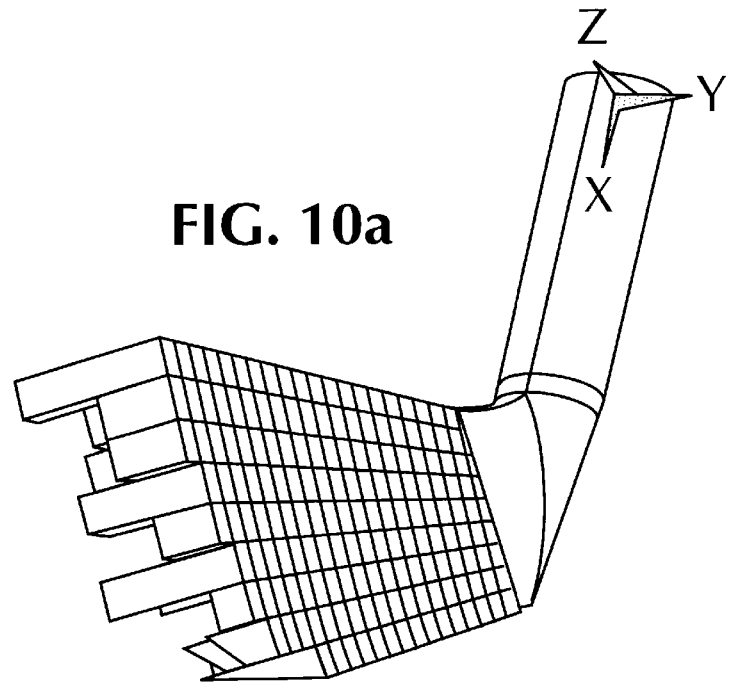
FIG. 10a illustrates a front perspective plot of a solid model of a golf club head in which the back-weighting was designed without the benefit of geometric influencing.
Figure 10B:
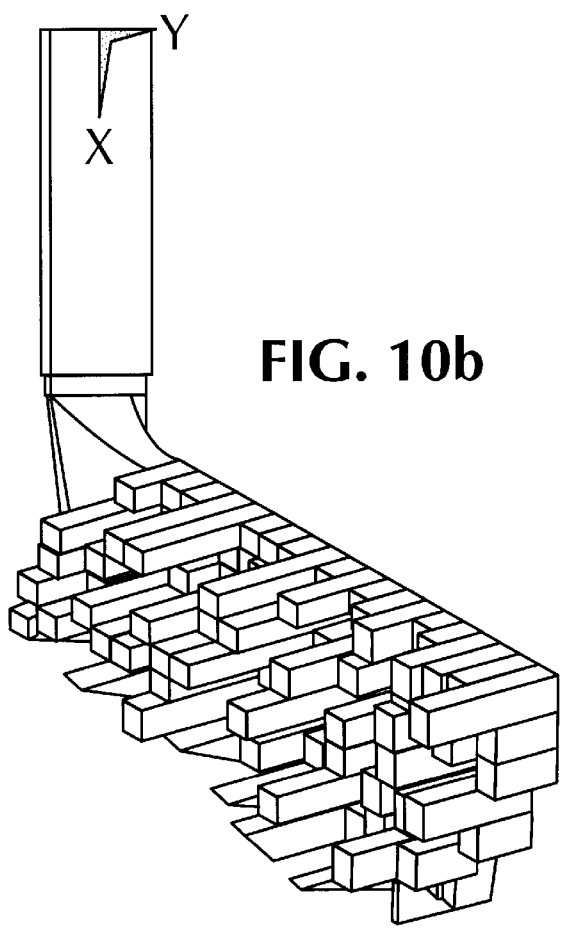
Figure 11:
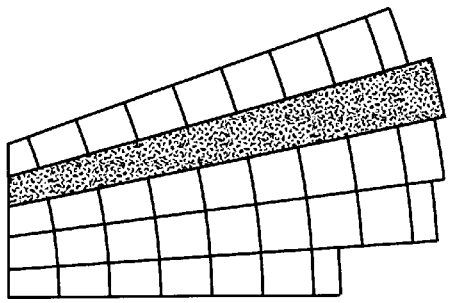
FIG. 11 illustrates an arrangement of adjacent bricks which are constrained relative to each other when the row constraint method of geometric influencing is used to create the back-weighting of a club head.
Figure 12:
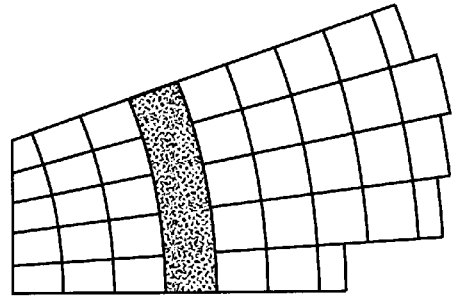
FIG. 12 illustrates an arrangement of adjacent bricks which are constrained relative to each other when the column constraint method of geometric influencing is used to create the back-weighting of a club head.
Figure 13:
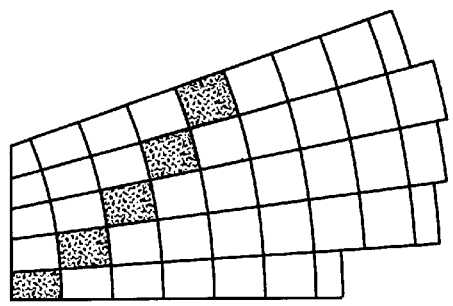
FIG. 13 illustrates an arrangement of adjacent bricks which are constrained relative to each other when the diagonal constraint method of geometric influencing is used to create the back-weighting of a club head.
Figure 14:
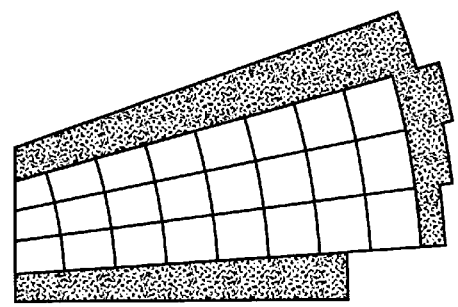
FIG. 14 illustrates an arrangement of adjacent bricks which are constrained relative to each other when the concentric ring constraint method of geometric influencing is used to create the back-weighting of a club head.

The algorithm begins by generating random numbers for an offset vector. The offset vector represents a change in height for each brick and has both positive and negative values. The offset vector plus the current brick height yields the total height of each brick for the next iteration. The mass properties of each brick are then calculated and combined to yield the mass properties of the entire club head, including the hosel and blend sections. If the new iteration causes the penalty function to become closer to zero, then the present offset vector is used again to determine the new brick heights for the following iteration. The same offset vector is used until the penalty function begins to increase. Once the penalty function increases, the previous iteration is undone and the offset vector is lessened in an attempt to converge on a solution. If this method fails, the random number generator creates a new offset vector and repeats the process continuing from the last valid iteration. Eventually, the optimization algorithm locates a solution within the convergence tolerance or reaches a point where a divergent design is created with each new offset vector. At such a point, the algorithm has reached an optimal solution. FIG. 10 illustrates a solid model of a club head which includes back-weighting designed using the method just described.

Figure 16A:
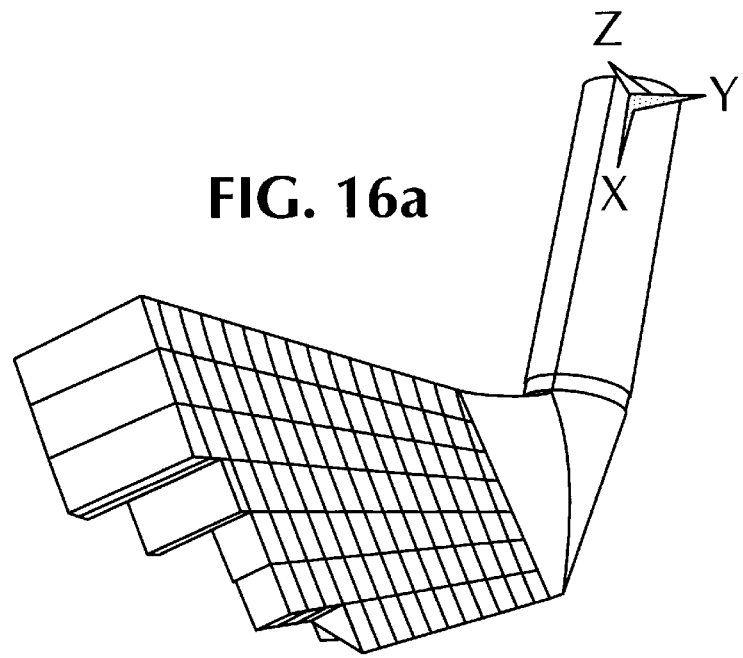
FIG. 16a illustrates a front perspective plot of a solid model in which the back-weighting was designed employing the column constraint method of geometric influencing.
Figure 16B:
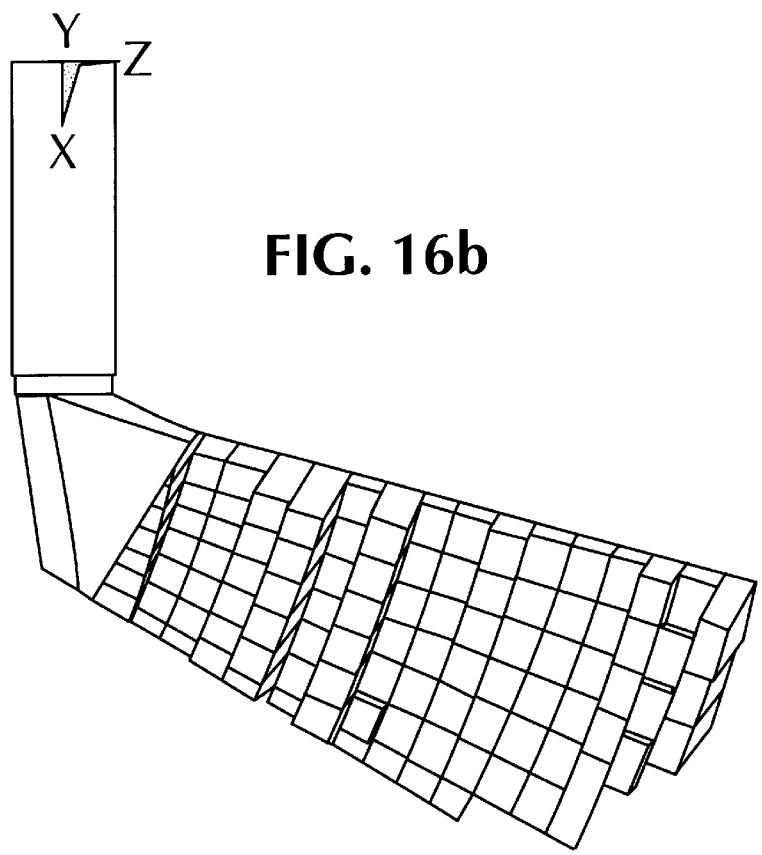
Figure 17A:
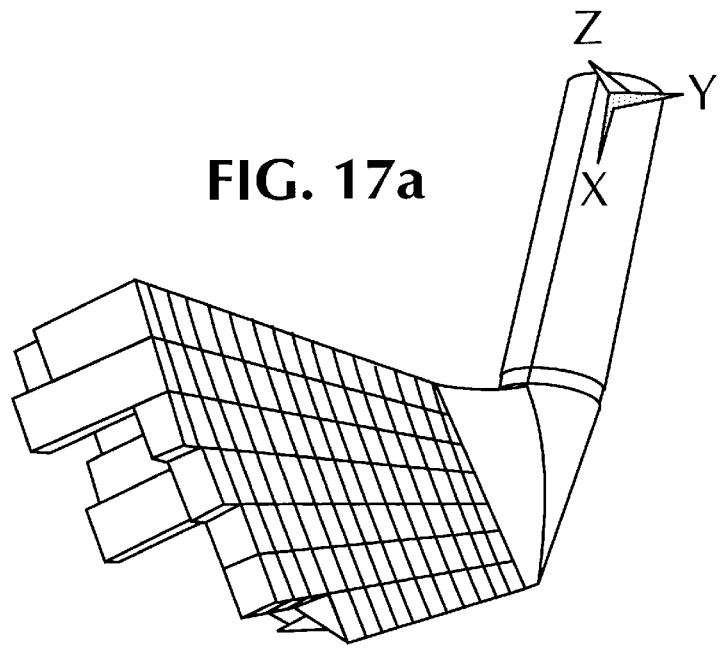
FIG. 17a illustrates a front perspective plot of a solid model in which the back-weighting was designed employing the diagonal constraint method of geometric influencing.
Figure 17B:
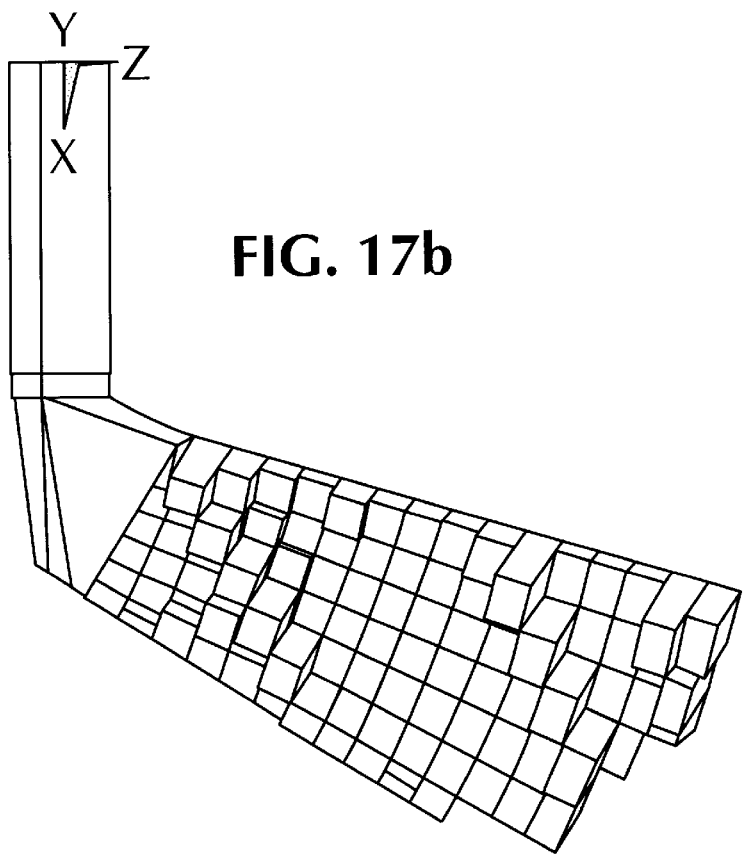

In an attempt to control and smooth the shapes of the back-weighting, geometric influencing is employed. A smooth shape on the back-weighting is desirable so as to create an attractive and easily manufacturable design. Geometric influencing is a method which controls the relative sizes of bricks identified as belonging to a group. The groups may include bricks which are arranged horizontally (row influencing—see FIGS. 11 and 15), vertically (column influencing—see FIGS. 12 and 16), diagonally (see FIGS. 13 and 17), as concentric rings (see FIGS. 14 and 18), or in any combination thereof. The designer selects the type of influencing, the number of groups, as well as, the size of the groups.

Figure 20A:
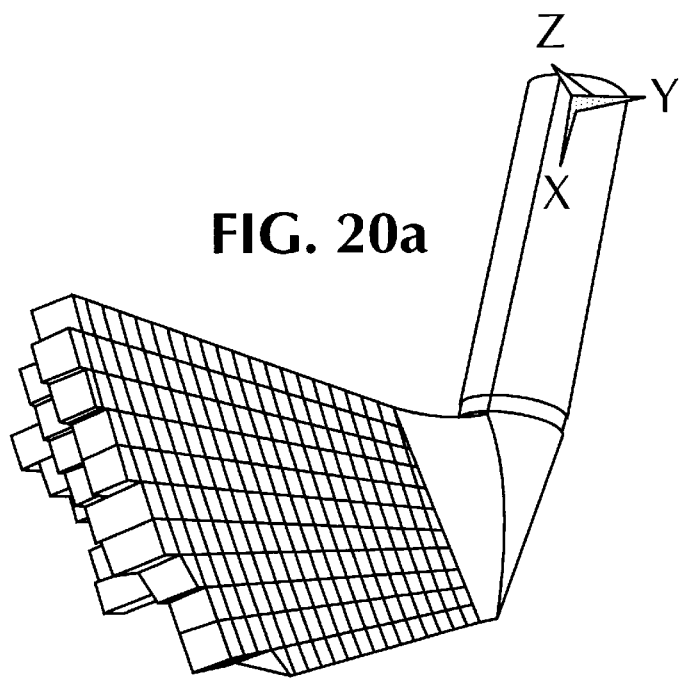
Figure 20B:
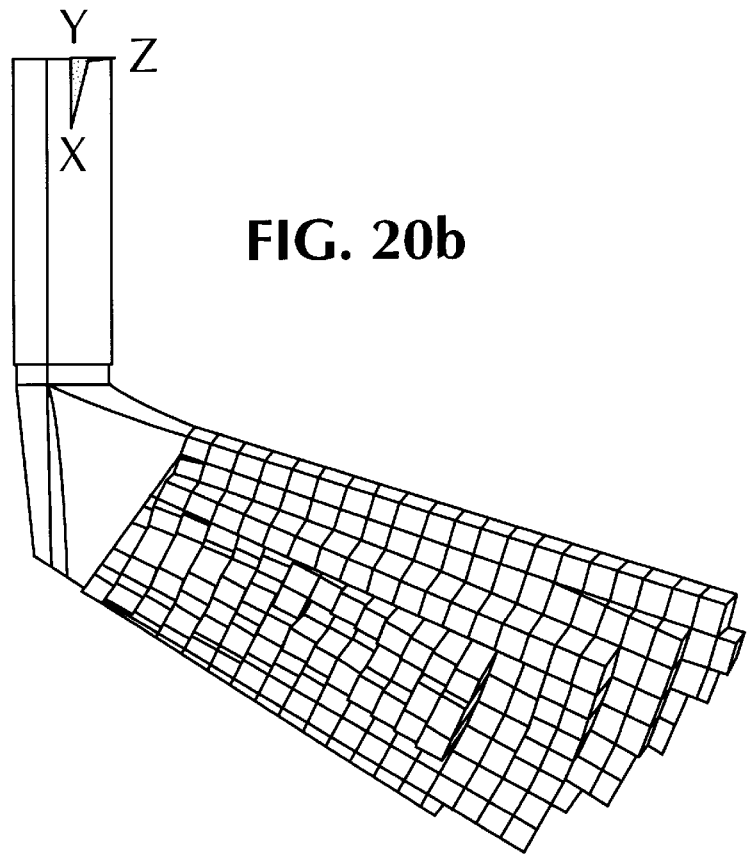

Geometric influencing causes the optimization algorithm to control the height of the bricks in a group. More specifically, the brick heights in a group are forced to lie in the same plane or in a line within said plane. The equation representative of a plane may take the form:

$$Z(I,J)=|E+F*I+G*J|,$$

where the constants E, F, and G locate and orient the plane, I and J are the row and column indices, respectively, in the plane of the club face, and Z(I,J) is the height of the brick at location I, J (FIG. 8). The absolute value of the right side of the equation is taken to prevent a negative brick height, i.e., a brick which grows out of the club face. A negative brick height is undesirable because the club face must be flat. Thus, the effect of producing V-shaped patterns relative to brick height is realized (FIG. 20).

The brick height Z(I,J) is a function of the brick number and the location and orientation of the plane defined by the constants E, F, and G. Each group has one set of plane constants. The optimization algorithm creates a vector of delta values for the plane constants and adds them to the current values. The optimization algorithm calculates Z(I,J) using the plane equation recited above to determine the individual brick heights in a group and the algorithm proceeds as before.

Groups are formed by controlling the value of the indices. For example, a row grouping (FIG. 11) is realized by setting the I index to a constant value. A diagonal grouping (FIG. 13) is formed by setting I=J or I=-J. These, in effect, reduce the planar equation to that of a line. The concentric ring grouping (FIG. 14) uses the full planar equation since both I and J are varied.

Geometric influencing reduces the number of variables considered from one per brick (height in the non-influenced method) to three per group (plane constants E, F, and G). Accordingly, both the number of acceptable designs and the solution time are decreased when more than three bricks are assigned to each group.

The non-influenced method continues to be of value because it yields the greatest possible number of solutions. Furthermore, valuable information concerning the choice of initial conditions, grouping methods, and reasonableness of selected mass properties is obtainable from the non-influenced method.

Because of the nature of the optimization algorithm, the final back-weighting configuration may depend upon the initial conditions (initial brick heights) selected by the designer. Therefore, for multiple solution situations, the designer may influence the shape of the final design by his selection of the initial conditions.

The execution time for the programs may be significant. There is a tradeoff between the smoothness of the back-weighting and execution time. While bricks having a smaller cross-sectional area (thus, a larger number of bricks) result in smoother contours of the back-weighting, computing time and memory needs are increased tremendously. For example, on a SUN SPARC 10 workstation, a design using 18 volume bricks converged in approximately 10 minutes whereas the same design using 174 volume bricks required approximately 2.5 hours.

Due to the increased execution time and reduced number of possible solutions required with an increased number of mass constraints, unnecessary constraints should either be removed or be changed to inequality mass constraints which are less restrictive.

Mass properties desired must be obtainable. As a result, selecting mass properties from an existing design and modifying them incrementally to achieve a new design is suggested to assure a high probability of the algorithm reaching convergence.

Once an acceptable solution is reached, the back-weighting design may be smoothed quickly by decreasing the brick size, setting the initial conditions to the solution values at the larger brick sizes, and performing the optimization algorithm a second time.

At the conclusion of the optimization function, the computer operating the back-weighting program captures the coordinates of the corners of the volume bricks (PB1 (I,J) through PB4(I,J) and PT1(I,J) through PT4(I,J)) to define finite element volumes for the solid model of the back-weighting and the club face. The computer then writes a file of modeling commands necessary to create a solid model of the back-weighting and club face. The file of FEA file commands for the back-weighting is read into the computer operating the FEA program where it is combined with the previously defined solid models of the hosel and blend sections to create the solid model of the entire club head (see FIG. 15 for an example). The designer can then plot and visually evaluate the club head design to determine whether the shape and the back-weighting are acceptable.

Along with the solid model, the mass properties of the entire club head are reviewed by the designer. If unacceptable results are obtained, the designer may modify one or more of the following parameters: desired mass properties, number and type of mass constraints, geometric influencing method, program execution parameters, initial conditions, and/or volume brick size. Further modification options are possible by alteration or re-design of the basic shape.

Test Results

Figure 9A:
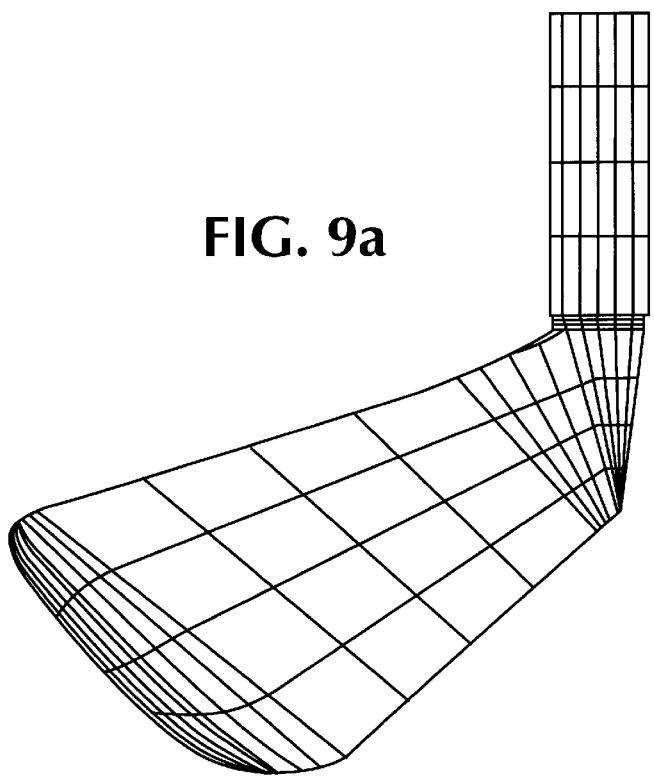
FIG. 9a illustrates a front perspective plot of a solid model employed by the present invention to determine the mass properties of an existing club head design.
Figure 9B:
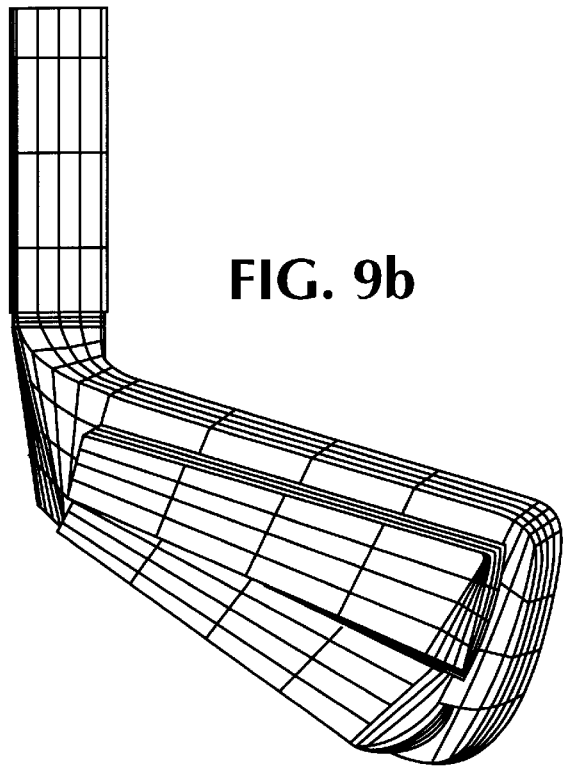

The method described herein was employed to design several dynamically equivalent 5-irons. The geometric specifications for the basic shape and the target mass properties for the club head were obtained from an existing design (see FIG. 9) to guarantee the existence of at least one solution. The mass properties of the existing design and thus, those used in the test were:

weight: 2.27N;

Location of center of gravity: (65.8, -8.6, 34.0) mm; and,
an inertia tensor governed by the equation:

$$\begin{vmatrix} Ixx & Ixy & Ixz \\ Ixy & Iyy & Iyz \\ Ixz & Iyz & Izz \end{vmatrix} = \begin{vmatrix} 471.6 & 146.7 & -627.4 \\ 146.7 & 1546.7 & 102.2 \\ -627.4 & 102.2 & 1134.5 \end{vmatrix} \times 10^{-6} \, (Kg - M^2)$$

All of the target mass property values were included and established as equality mass constraints. A mass property tolerance of one percent was specified. Scaling factors were included in the mass constraints so each constraint received equal weight in the penalty function. The brick size was set at 5.1 mm×5.1 mm and brick heights were limited between 5.1 mm and 20.3 mm. The initial brick heights were each set to 12.7 mm.

FIG. 10 illustrates the back-weighting design obtained without geometric influencing. FIGS. 15 through 18 illustrate the back-weighting designs obtained using a variety of geometric influencing combinations. Each of the designs meet the target mass requirements within the one percent tolerance established. The program execution time for each design was approximately one hour.

Figure 15A:
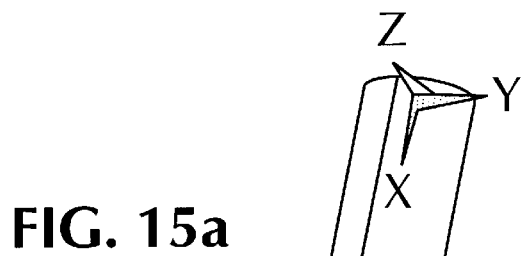
FIG. 15a illustrates a front perspective plot of a solid model in which the back-weighting was designed employing the row constraint method of geometric influencing.
Figure 15B:
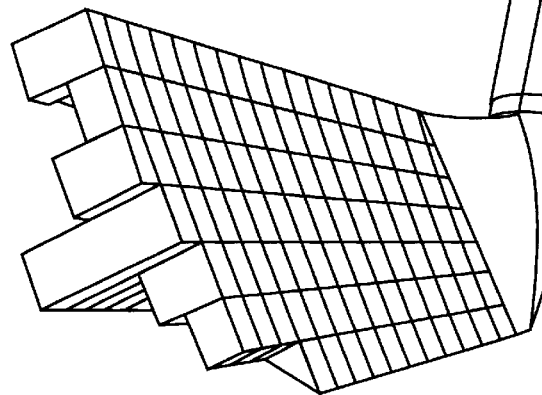
Figure 19A:
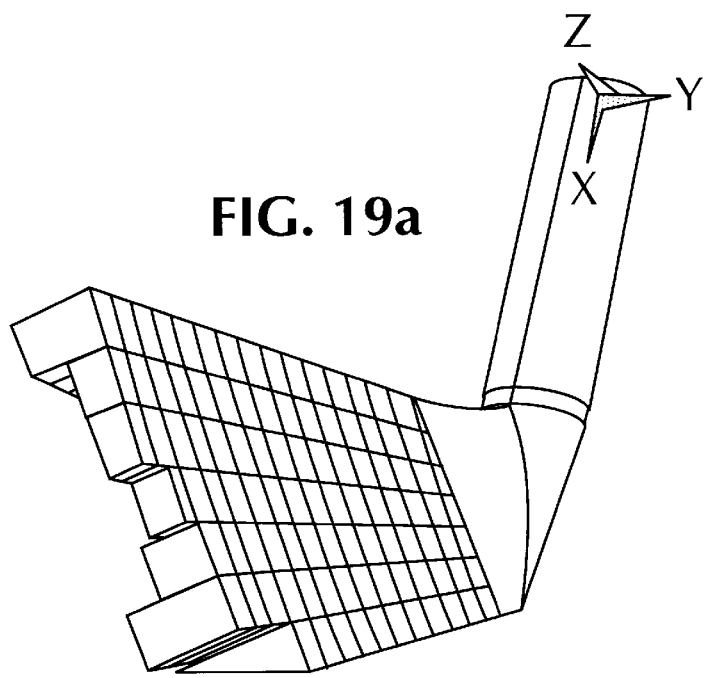
Figure 19B:
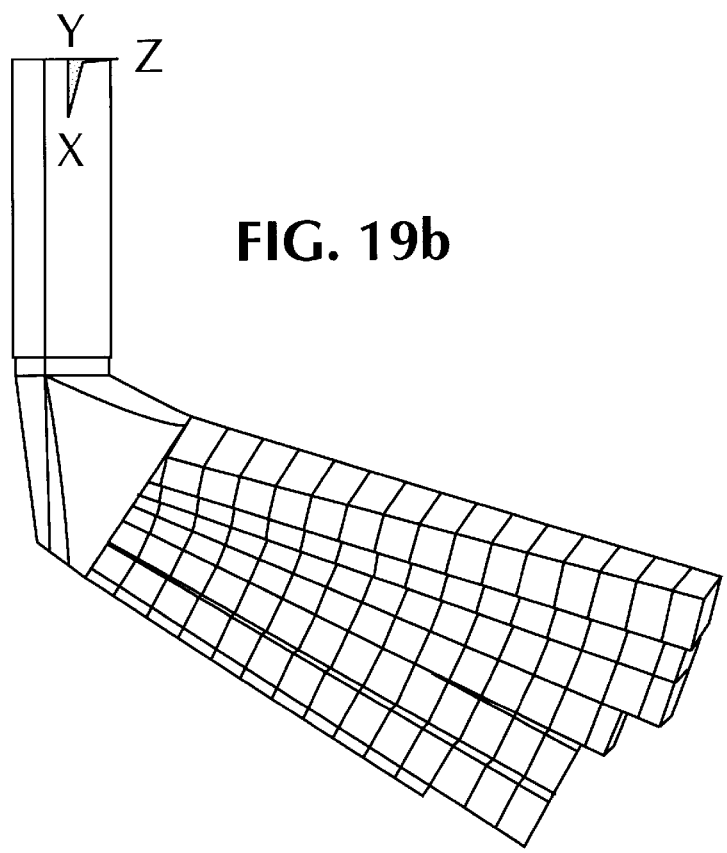

FIG. 19 illustrates a change in initial conditions from that of FIG. 15. Finally, FIG. 20 illustrates the effect of decreasing the size of the bricks to 3.8 mm×3.8 mm which resulted in an increase in solution time by 1.5 hours over that of FIG. 18.

The method of club head design described herein allows the designer to explicitly specify the basic geometry and mass properties early in the design process. The designer then utilizes the method to configure the club head to meet the previously specified criteria. Such a method frees the designer to concentrate on determining what geometry and mass properties are most desirable and delegates to the method, the burdensome task of configuring the shape of the club head to meet these specifications. The designer is allowed and encouraged to explore several different "dynamically equivalent" designs and select which is the most aesthetic, unique, and/or manufacturable.

Figure 23:
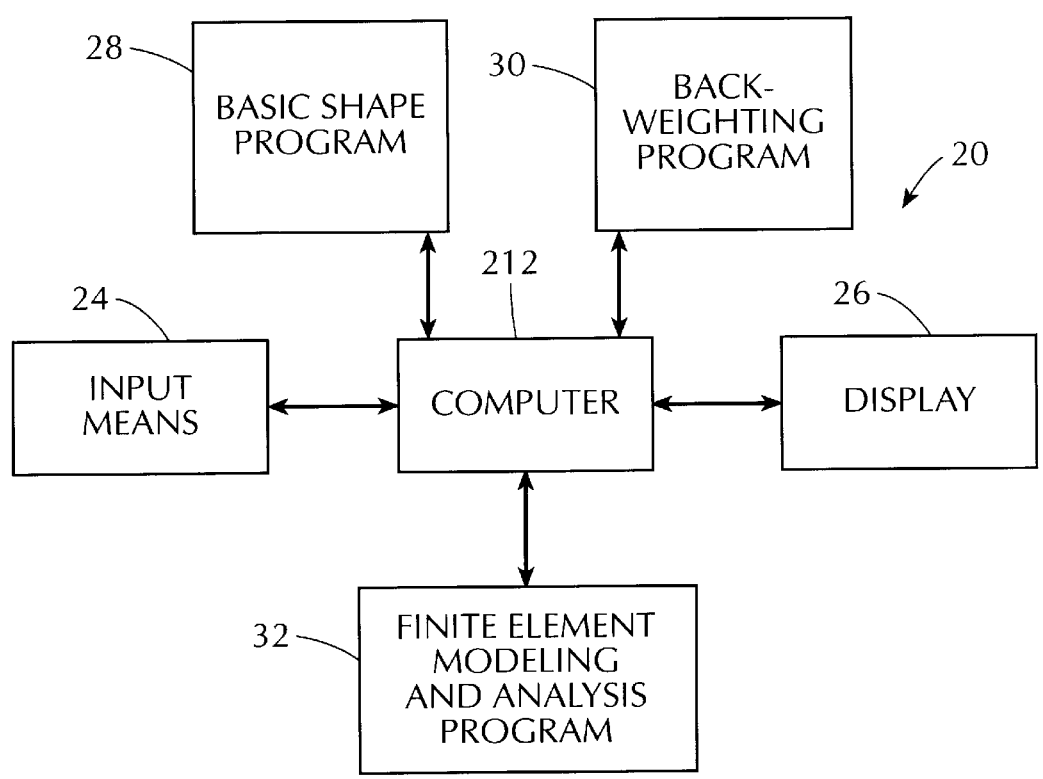
FIG. 23 is a schematic illustration of a system according to the present invention.

FIG. 23 illustrates a schematic of a system 20 according to the present invention. The system 20 includes a computer 22 having input means 24 and a display 26. Computer 22 operates a basic shape program 28, a back-weighting program 30, and a finite element solid modeling and analysis program 32. The system 20 operates to perform the method described above.

Once an acceptable design has been achieved, the dimensions of the solid model, being in a machine readable format, may be transferred to a computer controlled machining device to begin manufacture of the new design. This may be accomplished using a computer-numerical-control (CNC) machine and compatible computer-aided-manufacturing (CAM) software.

What is claimed is:

1. A method for the design of a golf club head comprising the steps of:
   selecting predetermined dimensions to define a club face and a hosel for a golf club head;
   locating critical points on or within said club face and said hosel to position said club face relative to said hosel and to determine a blend section for connecting said hosel to said club face to create a basic shape of said golf club head;
   selecting desired mass properties for said golf club head and types of mass constraints for said mass properties; and,
   generating a basic shape model of said golf club head using said predetermined dimensions, said desired mass properties and said types of mass constraints for said mass properties of said golf club head.

2. The method of claim 1 wherein said predetermined dimensions are selected from the group consisting of:
   full length of a hosel;
   length of a straight section of the hosel;
   outer diameter of the hosel at a junction with a club shaft;
   inner diameter of the hosel;
   outer diameter of the hosel at a base;
   rake angle of a club face;
   angle between the shaft and a bottom edge of the club face;
   inside height of the club head;
   outside height of the club head;
   total length of the club face;
   length of the bottom edge of the club face;
   thickness of the club face at a top;
   thickness of the club face at a bottom;
   club face bottom edge radius;
   club face top edge radius; and,
   club face outer edge radius.

3. The method of claim 1 further comprising the steps of:
   selecting back-weighting parameters including brick length, brick aswidth, and, initial brick height;
   dividing said club face into a matrix containing at least one volume brick based upon said back-weighting parameters for determining a back-weighting of the golf club head, each volume brick having a location relative to a predetermined coordinate system, a brick length, a brick width and a brick height;
   determining current mass properties of said club head;
   evaluating convergence of said current mass properties with respect to said desired mass properties;
   modifying variables selected from the group consisting of said back-weighting parameters, said desired mass properties, said predetermined dimensions and said mass constraints, and repeating said dividing, said determining, said evaluating and said modifying steps until convergence is obtained; and
   displaying a final solid model of said golf club head to illustrate said basic shape and said back-weighting for visual evaluation thereof.

4. The method of claim 1 wherein said critical points comprise: connection points between a rounded end section and a straight section of the club face; locations of centers of curvature for end sections of the club face; connection points between the club face and the blend section; locations where the blend section joins a lower portion of the hosel; and points which locate a bottom, a top, and a beginning of a tapered section of the hosel.

5. The method of claim 3 wherein said desired mass properties are selected from a group of mass properties consisting of: overall mass, mass center X-coordinate, mass center Y-coordinate, mass center Z-coordinate, and each of six elements of an inertia tensor.

6. The method of claim 5 wherein said types of mass constraints are selected from the group consisting of equality mass constraints and inequality mass constraints.

7. The method of claim 3 wherein said back-weighting parameters further include:
   minimum brick height; and
   maximum brick height.

8. The method of claim 3 wherein said critical points comprise: connection points between a rounded end section and a straight section of the club face; locations of centers of curvature for end sections of the club face; connection points between the club face and the blend section; four corners of bottoms of each volume brick located within a plane of a club face boundary; and four corners of tops of each volume brick.

9. The method of claim 3 wherein said step of determining current mass properties includes using finite element solid modeling methods.

10. The method of claim 3 wherein said step of modifying variables includes using an optimization algorithm.

11. The method of claim 3 wherein said back-weighting parameters further include a type of geometric influencing to be used in said step of modifying variables.

12. The method of claim 1 wherein said step of locating critical points includes using finite element solid modeling methods to obtain and evaluate said basic shape model.

13. The method of claim 1 further comprising the step of:
repeating said selecting, locating, and displaying steps to obtain a different basic shape model.

14. The method of claim 3 wherein said step of modifying variables includes using finite element solid modeling methods to obtain and evaluate said final model of the golf club head.

15. The method of claim 3 further comprising the step of:
repeating said selecting, dividing, determining, modifying, and displaying steps to obtain a different final model of the golf club head.

16. A system for the design of a golf club head comprising:
a computer which operates a basic shape program for creating a basic shape of a golf club head and a finite element solid modeling and analysis program for modeling and analyzing said design of said golf club head;
input means for entering user specified dimensions for said design of said golf club head; and
a display,
wherein said computer operating said basic shape program retrieves user-specified dimensions for the golf club head from said input means, locates first critical points and generates a blend section for connecting a club face and a hosel, and
wherein said computer operating said finite element modeling and analysis program retrieves said dimensions and first critical points to determine and output mass properties of said design of said golf club head and displays a basic shape model of said design of said golf club head on said display.

17. The system of claim 16 wherein said computer operates a back-weighting program,
wherein said computer operating said back-weighting program retrieves user-selected mass properties, user-selected mass constraints, and user-selected back-weighting parameters and locates second critical points, and
wherein said computer operating said finite element modeling and analysis program retrieves said first and second critical points to display a final back-weighted solid model.

18. The method of claim 1 further comprising the steps of displaying said basic shape of the golf club head for visual evaluation thereof.

19. A computer program embodied on computer-readable medium for designing a golf club head comprising:
a geometry design source code segment for causing a computer to effect the geometrical design of a golf club face, hosel, and blend sections of the gold club head using predetermined dimensions provided by a user; and
a back-weighting design source code segment for causing a computer to effect the design of back-weighting for the golf club head using mass properties and mass constraints provided by the user to develop a basic shape model of the golf club head.

* * * * *

UNITED STATES PATENT AND TRADEMARK OFFICE
CERTIFICATE OF CORRECTION

PATENT NO. : 5,877,970
DATED : March 2, 1999
INVENTOR(S) : Steven M. Nesbit, et al It is certified that error appears in the above-identified patent and that said Letters Patent is hereby corrected as shown below:

Column 6, line 42, change "b " to -by-

Signed and Sealed this

Twenty-ninth Day of June, 1999

Attest:

Q. TODD DICKINSON

*Attesting Officer*     *Acting Commissioner of Patents and Trademarks*